US012575703B2

(12) United States Patent (10) Patent No.: US 12,575,703 B2
Harding et al. (45) Date of Patent: Mar. 17, 2026

(54) HAND SANITIZER DISPENSING DEVICE

(71) Applicants:Jonathan Cole Harding, Denver, CO (US); Michael Barnett, Denver, CO (US)

(72) Inventors: Jonathan Cole Harding, Denver, CO (US); Michael Barnett, Denver, CO (US)

( * ) Notice: Subject to any disclaimer, the term of this patent is extended or adjusted under 35 U.S.C. 154(b) by 419 days.

(21) Appl. No.: 17/701,261

(22) Filed: Mar. 22, 2022

(65) Prior Publication Data

US 2022/0211224 A1 Jul. 7, 2022

Related U.S. Application Data

(63) Continuation-in-part of application No. 16/796,890, filed on Feb. 20, 2020, now Pat. No. 11,278,160.

(51) Int. Cl.
| | |
|---|---|
| *A47K 5/12* | (2006.01) |
| *G06F 3/0484* | (2022.01) |
| *G06K 7/10* | (2006.01) |
| *G06K 7/14* | (2006.01) |

(52) U.S. Cl.
CPC .......... *A47K 5/1217* (2013.01); *G06F 3/0484* (2013.01); *G06K 7/10297* (2013.01); *G06K 7/1417* (2013.01)

(58) Field of Classification Search
CPC ................ A47K 5/1217; A47K 5/1211; A47K 5/1208; G06F 3/0484; G06K 7/10297; G06K 7/1417
See application file for complete search history.

(56) References Cited

U.S. PATENT DOCUMENTS

| | | | |
|---|---|---|---|
| 4,815,635 A | 3/1989 | Porter | |
| 5,158,218 A | 10/1992 | Wery | |
| 5,908,143 A | 6/1999 | Crossdale | |
| 7,819,413 B2 * | 10/2010 | White .................... B62K 19/40 |
| | | | 280/281.1 |
| 8,240,508 B2 | 8/2012 | Wegelin | |
| 8,672,187 B2 | 3/2014 | Ophardt | |

(Continued)

OTHER PUBLICATIONS

International Search Report and Written Opinion in International Application No. PCT/US22/41538 mailed Feb. 2, 2023, 23 pages.

*Primary Examiner* — Donnell A Long
(74) *Attorney, Agent, or Firm* — Berg Hill Greenleaf Ruscitti LLP

(57) ABSTRACT

A hand sanitizer dispensing device and method of dispensing sanitizing fluid are disclosed. The device may be mounted to a scooter, a bicycle or other transport devices. The device has an outer shell, an inner pod that holds a bag of sanitizing fluid, and a top cover that secures the inner pod to the outer shell. A pump/nozzle assembly communicates with an actuator to selectively dispense the fluid. The device may be operated manually or by automatic activation. The device may communicate wirelessly with a mobile communication device allowing the user to purchase use of the dispensing device remotely. User interfaces of the communication device guide the user to execute the purchase, to unlock the device for use among other available functions. A purchase transaction for use of the dispensing device can be achieved within a communication network with options as to how the dispensing device is unlocked and operated.

4 Claims, 13 Drawing Sheets

(56)            References Cited

U.S. PATENT DOCUMENTS

| | | | |
|---|---|---|---|
| 10,034,576 B2 | 7/2018 | Barth | |
| 2005/0184097 A1 | 8/2005 | LeBlond | |
| 2006/0243740 A1* | 11/2006 | Reynolds | A47K 5/1208 |
| | | | 222/207 |
| 2009/0236254 A1 | 9/2009 | Jenkins | |
| 2009/0308887 A1 | 12/2009 | Woo | |
| 2013/0068790 A1 | 3/2013 | Patthey | |
| 2013/0299518 A1* | 11/2013 | McNulty | A47K 5/14 |
| | | | 222/207 |
| 2014/0231459 A1 | 8/2014 | Pelkey | |
| 2015/0105903 A1 | 4/2015 | Denny et al. | |
| 2015/0250941 A1 | 9/2015 | Kamen et al. | |
| 2016/0090288 A1 | 3/2016 | Givens, Jr. et al. | |
| 2016/0158107 A1 | 6/2016 | Dvorak et al. | |
| 2016/0309967 A1* | 10/2016 | Pelfrey | A47K 5/1217 |
| 2019/0367349 A1 | 12/2019 | Peters et al. | |

* cited by examiner

Tap To Unlock Sanitizer

HAND SANITIZER DISPENSING DEVICE

CROSS REFERENCE TO RELATED APPLICATIONS

This application is a continuation-in-part of U.S. application Ser. No. 16/796,890, filed on Feb. 20, 2020, now U.S. Pat. No. 11,278,160. The entire specification and figures of the above-referenced application are hereby incorporated, in their entirety by reference.

FIELD OF THE INVENTION

The invention relates to liquid dispensing devices, and more particularly, to a hand sanitizer dispensing device and associated method especially adapted for mounting on a mobile transportation items such as a scooter or bicycle.

BACKGROUND OF THE INVENTION

Hand sanitizer dispensing devices are commonly found in many public locations. For example, locations such as medical or dental offices, gyms, and retail stores provide hand sanitizing fluid with the intent to prevent the spread of communicable diseases in such public places.

Hand sanitizing fluid is typically dispensed from a flexible bag type container in which fluid is withdrawn from the flexible bag to dispense the fluid through a connected nozzle. It is well known to dispense sanitizing fluid through a conventional pump dispenser, similar to the dispensing of body lotion, shampoo, or other toiletry liquids.

Recently, public transportation, particularly in crowded metropolitan areas, provides non-traditional transportation means such as scooters and bicycles. These means of transportation are relatively inexpensive and simple to employ for people who require transportation across short distances. Today, many downtown areas in cities provide both bicycle and scooter rentals in which a user may execute the rental transaction by a credit card reader incorporated on the bicycle/scooter. Through a credit card, the identity of the user is confirmed. GPS tracking is also commonly used to confirm the location of the bicycle/scooter to prevent theft.

Considering the increasing use of non-traditional means of transportation within shorter transportation routes, there is also a need to provide a convenient, nonintrusive hand sanitizing dispenser so that a user may keep their hands clean. Considering the number of uses of the bicycle/ scooters, the hand sanitizing fluid could be used with a sterile wipe provided by the user or by a separate paper product that could be soaked with the hand sanitizer allow- ing a user to wipe down the handles, seat, and any other location on the bicycle/scooter.

It is common to find freestanding hand sanitizer dispens- ing stands in such locations in which the dispensing device is secured to a bracket position that the top end of the dispensing stand. More specifically, the dispensing stand typically has a base similar to a standing lamp, and a single vertical post with the bracket at the top end thereof.

With respect to use of a hand sanitizer dispensing device directly mounted on a scooter or bicycle, special modifica- tions are required to a standard dispensing device. Further, in order to improve the ability to selectively dispense a desired amount of sanitizing fluid, there must also be modi- fications made to how the dispenser is activated by a user.

In connection with the present invention, modifications and improvements are provided for a hand sanitizer dispens- ing device that can be directly mounted to a scooter or bicycle. Further, the method by which the device is activated is also optimized such that the user can quickly and effi- ciently dispense a desired quantity of the sanitizing fluid.

SUMMARY OF THE INVENTION

The invention comprises a hand sanitizer dispensing device and method of dispensing a sanitizing fluid. The device is especially adapted to be mounted on a transpor- tation device such as a scooter or bicycle. The structure of the device includes an outer frame or shell that is directly mounted to the transportation device, such as by a zip tie, hook and pile strap, or other means of attachment. The outer frame receives an inner pod that holds a container of sanitizing fluid. The front face of the device has a front cover that is placed over the front open face of the inner pod to secure the fluid container.

In a manual mode, a handle or lever is used to dispense the sanitizing fluid. The handle or lever is connected to a rack and pinion type actuator mechanism. The actuator mechanism allows dispensing of the sanitizing fluid through a pump/nozzle piece of the fluid container. The pump/nozzle piece is operated to draw fluid into the pump and then delivers fluid through the nozzle.

Components of the actuator mechanism include two spaced gear supports with rack gears and an actuator plate that interconnects the gear supports. The lever has a stem that terminates with a transverse pin mounted between a pair of brackets within the outer shell. The opposite ends of the pin each have corresponding pinion gears that engage the rack gears. The actuator plate contacts the pump and nozzle piece. In order to dispense sanitizing fluid, the user grasps the lever and causes it to move back and forth thereby operating the pump. The actuator plate causes a depressible sleeve of the pump to be repeatedly depressed and released thereby causing the pump to successively pressurize a container of sanitizing fluid (such as a flexible bag) to thereby dispense the fluid through the connected nozzle. Alternatively, in another mode of fluid dispensing, the pump and nozzle piece can be a conventional spray nozzle device in which sanitizing fluid is withdrawn or pulled from the reservoir of fluid in the bag and then sprayed or discharged through the nozzle.

The rear surface of the outer shell has a concave shape that receives the stem or tube of a scooter or bicycle. The concave shape assists in maintaining the device in a securely mounted position since the surface area in contact is increased by the complementary concave shape.

In order to replace the bag of sanitizing fluid, the front cover is removed, the spent bag and the connected pump/ nozzle piece is removed from within the inner pod. A new bag of fluid is placed within the inner pod and the front cover is then reattached. The front cover has a pair of upper engaging tabs that are resiliently received in corresponding retaining slots formed in the upper portion of the outer frame. To remove the front cover, the upper engaging tabs are depressed by a key device that allows the tabs to be disengaged from the retaining slots. To replace the front cover, it is realigned with the inner pod and the cover is aligned to snap the engaging tabs back into their correspond- ing retaining slots.

In the preferred embodiment of the device, the exposed lever extends away from the lower surface of the outer shell enabling it to be easily grasped by the user. The hand sanitizer device may therefore be operated by the user at any desired position with respect to the scooter or bicycle upon which the dispensing device is mounted.

According to another embodiment of the invention, dispensing is achieved in an automatic manner by use of a sensor that senses the motion or heat signature of a hand placed under the dispenser. The sensor is electrically connected to the pump/nozzle piece and activates the pump portion of the pump/nozzle piece to dispense fluid. Any type of sensor can be used that electrically connects to the pump to activate the pump once a user's hand is sensed. Examples of sensors include photo sensors, passive infrared sensors, and others. The pump portion of the pump/nozzle piece may be battery powered.

According to a method of the invention for manual activation, dispensing of a sanitizing liquid is provided. A dispenser device is secured to an object such as a scooter or bicycle. The dispensing device is loaded with a flexible bag of sanitizing liquid that has an integral pump/nozzle piece. A user grasps the lever and moves it back and forth or in a reciprocating action to dispense a desired quantity of the sanitizing liquid. The lever rotates about an axis oriented in a transverse direction to the front and rear sides of the dispensing device. The extent of rotation of the lever is limited by the length of an opening formed in the lower surface of the outer shell.

According to the method of the invention for automatic activation without requiring the user to move the lever, the user simply places his/her hands under the dispensing device and fluid will be dispensed as actuated by the sensor that communicates with the pump.

According to another aspect of the invention, the device of the invention may be controlled for activation and deactivation in conjunction with the device being used on a scooter or bicycle. In this regard, the invention may further include a mobile communication application or "App" capability that allows the user to control the dispensing device as a supplemental function of the scooter or bicycle. More specifically, it has recently become popular to provide shared scooters and bicycles that can be rented by use a mobile phone. The user has an App on downloaded on their mobile phone that allows the user to select the scooter or bicycle (hereinafter also referred to as a "transport") at a convenient location close to the user. The technology supporting such an App includes a GPS capability in which the location of the user is known and available transports are shown on a user interface map. The user is previously registered on the App with proper identifying credentials in order to execute an online rental transaction. One example of how the rental transaction occurs is that the transport has a scanner that scans a QR code displayed on the user's phone that is created upon executing the rental transaction. Once the QR code is successfully scanned the scooter is unlocked and may be used by the user until the user decides to cease use by closing out the rental transaction on the user's phone App. In the present invention, the same technology can be employed in which scanning the QR code on the scanner installed on the scooter or bicycle allows the dispensing device to be unlocked for use. One commercial example of a scooter rental transaction that can be executed on a phone App is Bird. Basic information available on the technology to include instructions on how to download a Bird App and conduct a rental transaction may be found on www.bird.co.

Scooters and bicycles that can be rented by use of a mobile phone are Internet of Things (IoT) devices. The Internet of Things (IOT) is a network of "smart" devices that are connected to and communicate over a designated communications network such as the Internet. An IoT device can collect and exchanging information through embedded software, sensors, cameras, and other components that sense and record data relating to observed parameters such as distance and movement. Smart devices like shared scooters and bicycles are controlled and monitored remotely.

Functionality associated with use of an App in the present invention is related to unlocking the dispensing device for use wherein additional functionality could be employed such as the period of time the dispensing device is unlocked for use and the number of times the dispensing device is activated for use.

Considering the foregoing features of the invention, in one aspect, it may be considered a hand sanitizing dispensing device for dispensing a quantity of fluid therefrom, comprising: an outer shell; an inner pod received through an open front of said outer shell; a front cover placed over a front surface of said inner pod and said front cover having a rear edge that connects with a front edge of said outer shell; actuator means connected to said shell; a pump communicating with said actuator means, said pump having a nozzle opening for dispensing sanitizing fluid; said actuator means connected to a lever allowing a user to operate said actuator means and to engage said pump to dispense sanitizing fluid; and wherein said lever is moved back and forth causing said actuator to contact said pump to withdraw sanitizing fluid from a flexible bag type container and subsequently causing sanitizing fluid to be dispensed through said nozzle opening.

In another embodiment of the invention, it may be considered a hand sanitizing dispensing device for dispensing a quantity of fluid therefrom, comprising: an outer shell; an inner pod received through an open front of said outer shell; a front cover placed over a front surface of said inner pod and said front cover having a rear edge that connects with a front edge of said outer shell; actuator means connected to said shell; a pump communicating with said actuator means, said pump having a nozzle opening for dispensing sanitizing fluid; said actuator means including a sensor that senses the presence of a user's hand; and wherein sensing the presence of the user's hand results in said actuator to activate said pump to withdraw sanitizing fluid from a flexible bag type container and subsequently causing sanitizing fluid to be dispensed through said nozzle opening.

In another aspect of the invention, it may be considered a method of dispensing sanitizing fluid from a hand sanitizing dispensing device comprising (a) providing a hand sanitizer device comprising an outer shell, an inner pod received through an open front of said outer shell, a front cover placed over a front surface of said inner pod and said front cover having a rear edge that connects with a front edge of said outer shell, an actuator mounted in said shell, a pump communicating with said actuator, said pump having a nozzle opening for dispensing sanitizing fluid, and actuating said actuator to cause sanitizing fluid to be dispensed through said nozzle opening.

According to another aspect of the invention, it may be considered a method of dispensing sanitizing fluid from a hand sanitizing dispensing device activated through a mobile phone application (App) comprising: (a) providing a hand sanitizer device comprising an outer shell, an inner pod received through an open front of said outer shell, a front cover placed over a front surface of said inner pod, an actuator mounted in said shell, a pump communicating with said actuator, said pump having a nozzle opening for dispensing sanitizing fluid; (b) providing an App installed on a mobile communication device, said App having a plurality of user interfaces enabling a user to select activation of said dispenser device; (c) conducting a rental transaction for a transport utilizing said App such that the user executes the rental transaction by a QR code appearing on the user's mobile communication application that activates the transport; (d) further using the App to selectively unlock the sanitizer device for use; and (e) actuating said actuator to enable sanitizing fluid to be dispensed through said nozzle opening.

According to yet another aspect of the invention, it may be considered a hand sanitizing dispensing device for dispensing a quantity of fluid therefrom, comprising: an outer shell having top and bottom surfaces, lateral side surfaces, a rear surface with a concave shape and an open front; an inner pod having top and bottom services, lateral side surfaces, a front surface, and an open rear, said inner pod received through said open front of said outer shell; a front cover having top and bottom surfaces, lateral side surfaces, a front surface, and an open rear, said front cover placed over said front surface of said inner shell; an actuator mounted to said dispensing device; a pump communicating with said actuator and having a dispense opening for dispensing the fluid, wherein said actuator communicates with said pump to dispense the fluid; a microcontroller mounted to said outer shell, said microcontroller communicating with said actuator to control actuation of said actuator; and preprogrammed computer instructions stored in said microcontroller for executing actuation of said actuator wherein said instructions include at least one of controlling actuation for dispensing the fluid: (1) over a period of time; (2) for a predetermined number of pump actuations; or (3) a combination of (1) and (2).

A number of optional features may be associated with the foregoing recited hand sanitizing dispensing device. These optional features may include: (1) wherein: said actuator includes a sensor that senses the presence of a user's hand; and wherein sensing the presence of the user's hand results in said actuator to activate said pump to withdraw the fluid from a flexible bag type container and subsequently causing the fluid to be dispensed through a nozzle opening of said pump; or (2) said dispensing device further including a status indicator controlled by said microcontroller that indicates when fluid retained in said hand sanitizing dispensing device is low or out of fluid.

According to yet another aspect of the invention, it may be considered a method of dispensing sanitizing fluid from a hand sanitizing dispensing device comprising: providing a hand sanitizer device comprising: (a) an outer shell; (b) a front cover placed over said outer shell; (c) an actuator mounted to said hand sanitizer device; (d) a pump communicating with said actuator, said pump having a nozzle opening for dispensing the sanitizing fluid; (e) a microcontroller mounted to said outer shell, said microcontroller communicating with said actuator to control actuation of said actuator; and (f) preprogrammed computer instructions stored in said microcontroller for executing actuation of said actuator wherein said instructions include at least one of controlling actuation for dispensing the sanitizing fluid: (1) over a period of time; (2) for a predetermined number of pump actuations; or (3) a combination of (1) and (2); and actuating said actuator to cause the sanitizing fluid to be dispensed through said nozzle opening.

A number of optional features may be associated with the immediate foregoing recited method of dispensing sanitizing fluid. These optional features may include: wherein said actuator includes a sensor that senses the presence of a user's hand, wherein upon sensing the user's hand, the sensor transmits a signal to said pump thereby activating the pump to dispense sanitizing fluid; or generating a status of fluid in said hand sanitizer dispensing device as to when fluid retained in said hand sanitizing dispensing device is low or out of fluid, said status being controlled by said microcontroller.

According to yet another aspect of the invention, it may be considered a method of dispensing sanitizing fluid from a hand sanitizing dispensing device mounted to a transport device comprising: providing a hand sanitizing dispensing device with an actuator to dispense sanitizing fluid; providing a mobile communication device with an App to control dispensing of sanitizing fluid from said hand sanitizing dispensing device; providing a microcontroller mounted to said transport device or said hand sanitizer device, said microcontroller communicating wirelessly with said App of said mobile communication device, said microcontroller further communicating with said actuator to control actuation of said actuator based on a command generated from said App; providing preprogrammed computer instructions stored in said microcontroller responsive to the command from said App for executing actuation of said actuator; operating the App to generate a command for use of the dispensing device; viewing a status of the dispensing device on a first user interface of the App to confirm the mobile communication device successfully communicated with the hand sanitizing dispensing device to operate the hand sanitizing dispensing device; and actuating said actuator to cause sanitizing fluid to be dispensed.

A number of optional features may be associated with the immediate foregoing recited method of dispensing sanitizing fluid, including: wherein said first user interface includes an instruction for a user to operate the dispensing device by unlocking the dispensing device; wherein said actuating step includes a second user interface shown on said App indicating the dispensing device is unlocked and ready for use; providing a third user interface shown on said App that includes a map of a preselected area where at least one transport device is located; and wherein the user selects a location where a transport device is located to initiate a transaction to use the hand sanitizer dispensing device; providing a fourth user interface shown on said App that includes a display of a cost of a transaction associated with use of the hand sanitizer dispensing device to dispense the sanitizing fluid; or providing a fifth user interface shown on said App that includes a display showing an unlocking function in which unlocking of the hand sanitizer dispensing device is achieved by scanning a QR code or engaging an NFC tag associated with said hand sanitizer dispensing device.

According to yet another aspect of the invention, it may be considered a system to facilitate dispensing of a fluid such as sanitizing fluid dispensed from a dispensing device, the system comprising: at least one dispensing device with an actuator to dispense said fluid; a mobile communication device with an App to control dispensing of fluid from said hand sanitizing dispensing device; a microcontroller communicating wirelessly with said App of said mobile communication device, said microcontroller further communicating with an actuator of said at least one dispensing device to control actuation of said actuator based on a command generated from said App; preprogrammed computer instructions stored in said microcontroller responsive to commands from said App for executing actuation of said actuator; and at least one of a RFID tag or NFC tag associated with said at least one dispensing device to identify said at least one dispensing device to execute a transaction enabling a user to unlock and use the at least one dispensing device.

A number of optional features may be associated with the immediate foregoing recited system to facilitate dispensing of a fluid such as sanitizing fluid dispensed from a dispensing device including: a kiosk communicating with at least one of said App and said microcontroller through a communications network, said kiosk being remotely located from said mobile communication device and said microcontroller, wherein the user executes the transaction by commands entered through said kiosk; wherein said kiosk or said App has a first user interface with an instruction for a user to operate the dispensing device by unlocking the dispensing device; wherein said kiosk or said App has a second user interface indicating the dispensing device is unlocked and ready for use; wherein said kiosk or said App has a third user interface providing a map of a preselected area where at least one transport device is located and wherein the user selects a location where a transport device is located to initiate a transaction to use the dispensing device; wherein said kiosk or said App has a fourth user interface that includes a display of a cost of a transaction associated with use of the hand sanitizer dispensing device to dispense the fluid; or wherein said kiosk or said App has a fifth user interface that includes a display showing an unlocking function in which unlocking of the dispensing device is achieved by scanning a QR code or engaging an NFC tag associated with the dispensing device.

With respect to a method of dispensing of the invention according to one or more preferred embodiments, the App that controls the dispensing device can be incorporated within the same App that controls the transport IoT device. Alternatively, the App that controls the dispensing device can be a separate App that communicates with the App that controls the transport IoT device.

According to yet another aspect of the invention, it may be considered a combination of a hand sanitizer device mounted to a transport such as a bicycle or scooter. The hand sanitizer device, as mentioned, may be mounted to the vertical stem or steering column of a scooter or to one of the frame tubes of a bicycle.

Other features and advantages of the invention will become apparent from a review of the drawings in connection with the detailed description that follows.

DETAILED DESCRIPTION OF THE DRAWINGS

Figure 1:
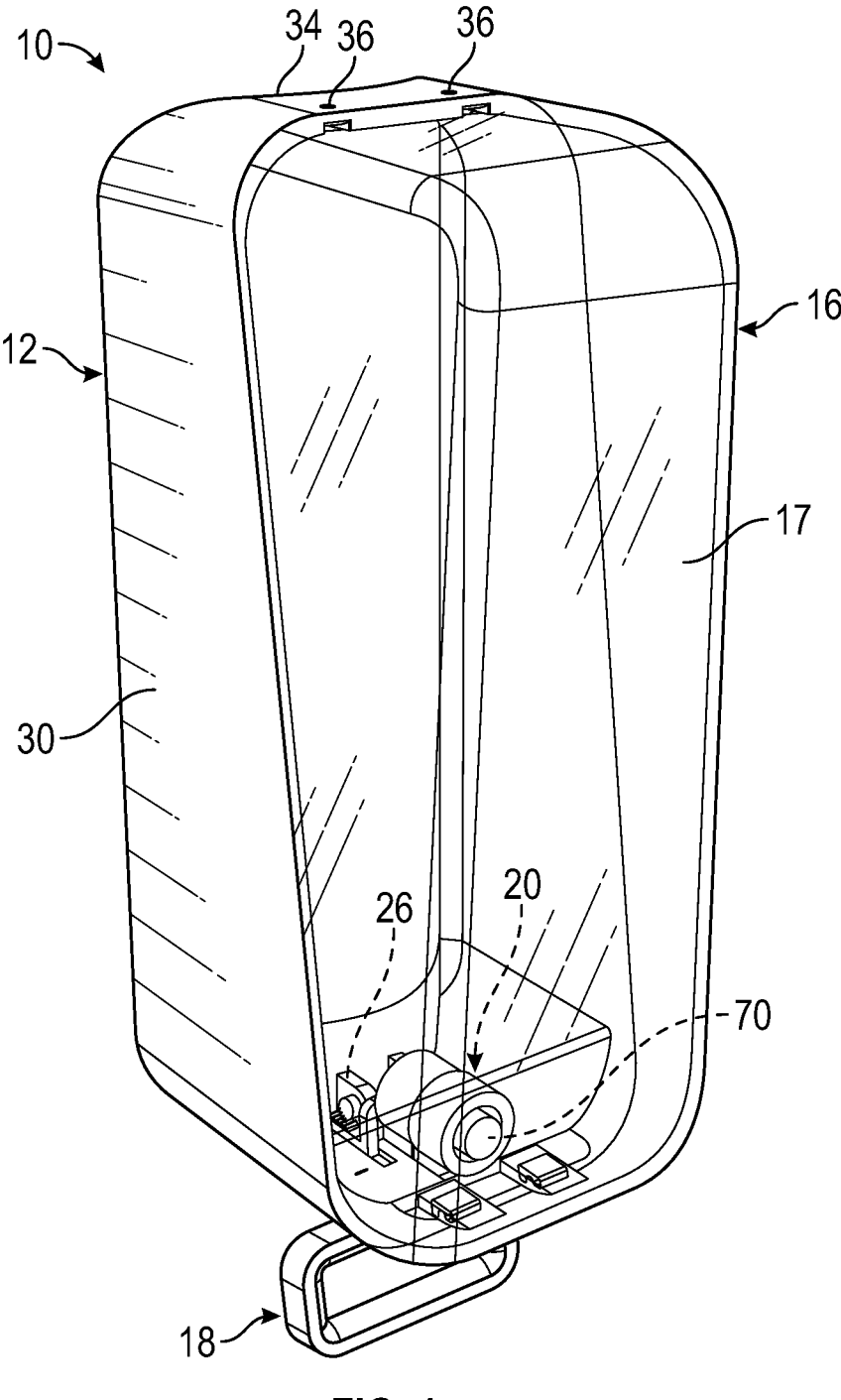
FIG. 1 is a front perspective view of the dispensing device of the invention.

Referring to FIGS. 1-4, these illustrate a preferred embodiment of the hand sanitizer dispensing device 10 of the invention. The dispensing device 10 is shown in an upright position. Descriptions follow regarding the orientation of the components of the dispensing device. It should be understood that references made to terms including "upper" and "lower", "front" and "rear" and others of the components, do not require that the device be mounted in the upright position. Rather, the device can be mounted at any particular orientation. Accordingly, references made herein for terms relating to the particular orientation of the components are simply to provide an explanation of the structure of the device and the arrangement of the elements of the device with respect to one another.

The device 10 has an outer shell 12 forming a rear portion of the device. The outer shell 30 has a continuous sidewall or outer surface 30 that has upper and lower surfaces and opposing side or lateral surfaces. The front face of the shell 12 is defined by a forward or front edge 56 that has a generally rectangular shape. The width of the outer shell 12 is wider at the lower end as compared to the upper end thereof. The interior rear surface 38 of the shell 12 has a convex curvature shape oriented along a long or longitudinal axis of the outer shell.

Figure 2:
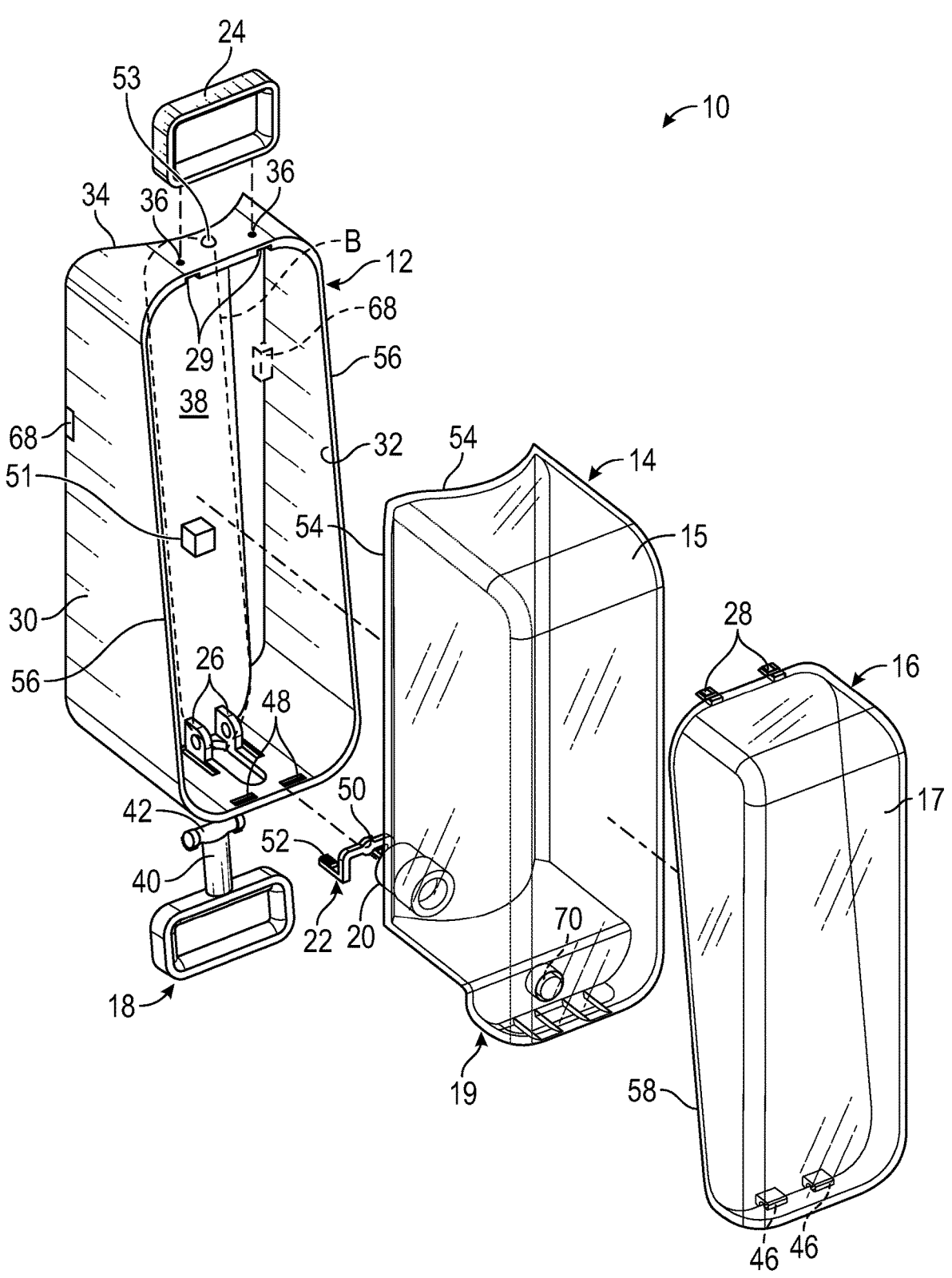
FIG. 2 is an exploded front perspective view of the dispensing device.
Figure 3:
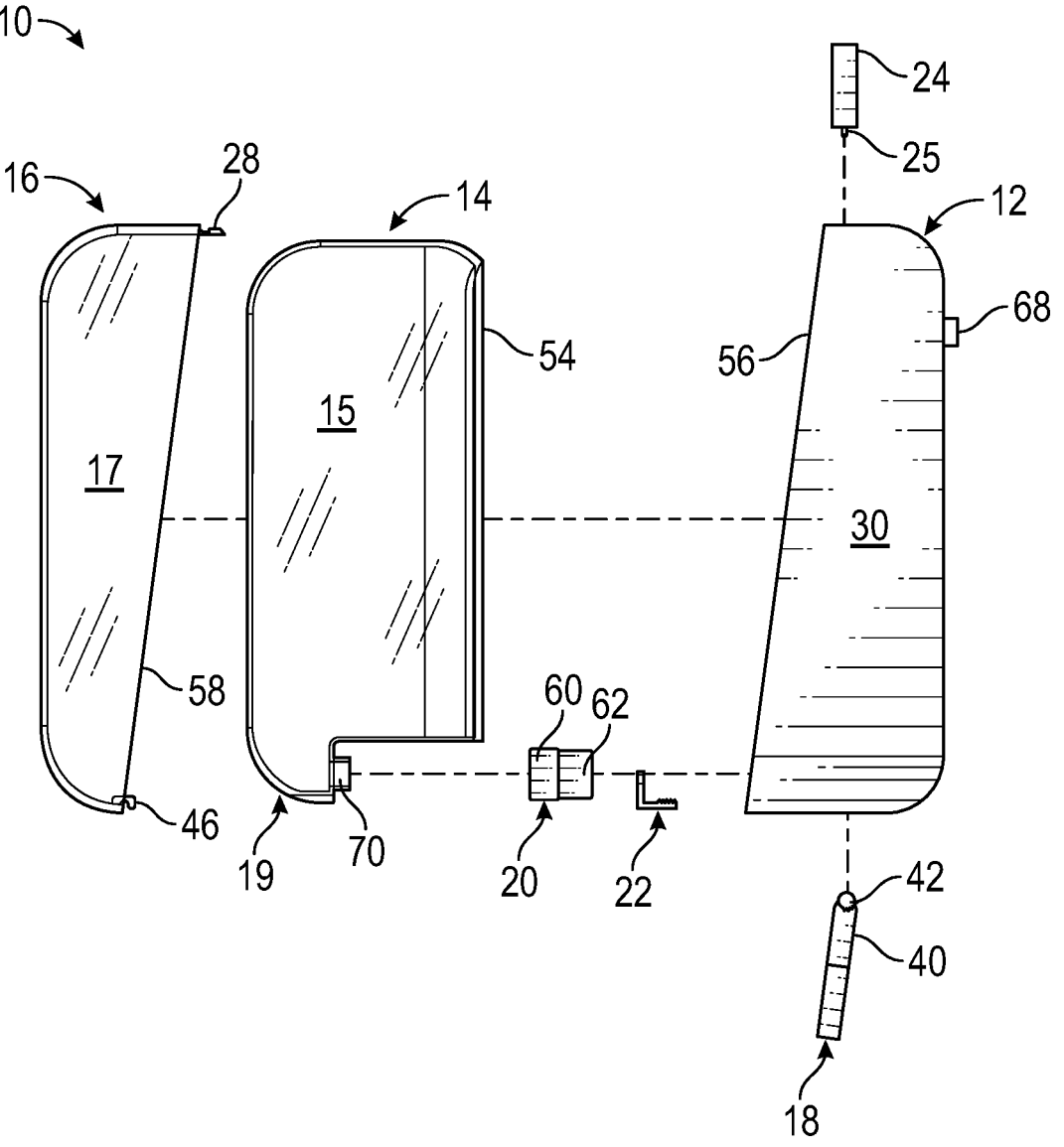
FIG. 3 is an exploded side elevation view of the dispensing device.

An inner pod 14 made of a preferably a clear molded plastic piece is held within the outer shell. The inner pod 14 also has a continuous outer surface 15 with corresponding upper and lower surfaces, corresponding lateral side surfaces, and a front face as shown. As best shown in FIG. 2, the inner pod 14 also has a depending or overhanging edge 19 that accommodates connection of the pump/nozzle piece or pump 20 as set forth below. When secured within the outer shell 12, the rear edge 54 of the inner pod 14 abuts the interior rear surface 38 of the outer shell 12. The upper and lower portions of the rear edge 54 have complementary concave shapes to match the convex shape of the interior rear surface 38. The inner pod 14 may have an open rear side or the inner pod may have a closed rear side in which case the container of sanitizing fluid is sealed within the inner pod.

The front cover 16 is also made of a preferably a clear molded plastic piece and is placed over the inner pod 14. Like the outer shell and inner pod, the front cover 16 also has a rectangular shape and a continuous outer sidewall or outer surface 17. In order to secure the front cover, lower engaging tabs 46 of the front cover 16 are placed within matching engagement slots 48 in the lower surface of the shell 12. The front cover is then rotated so that the upper engaging tabs 28 are slid into the upper engaging slots 29 of the shell 12. The rear edge 58 of the front cover 16 abuts the front edge 56 of the outer shell 12.

Figure 5:
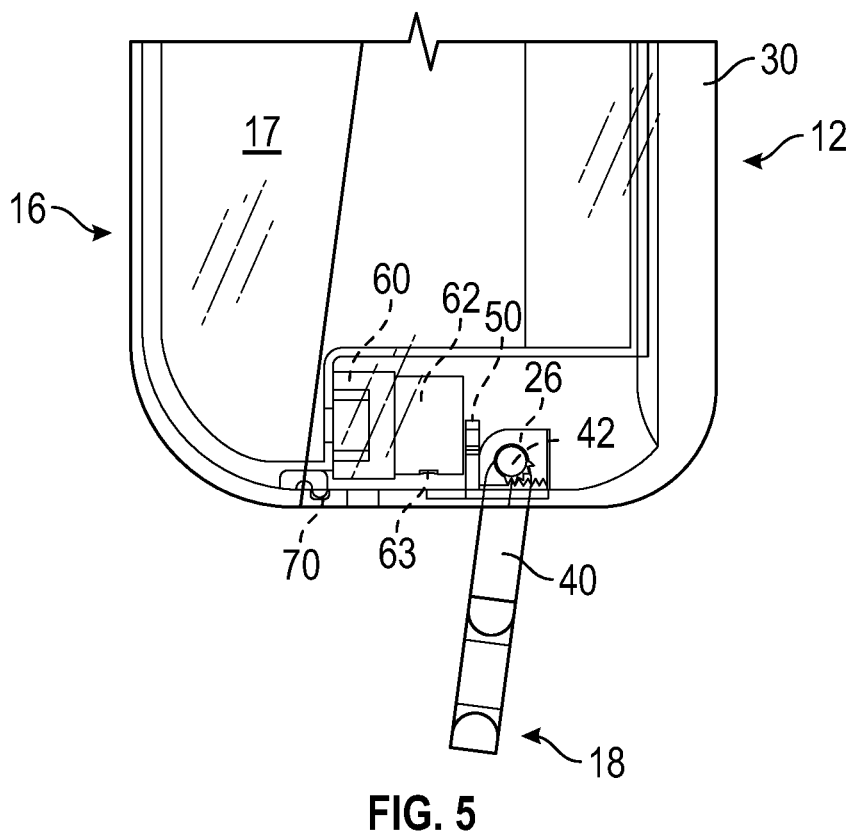
FIG. 5 is an enlarged side elevation view of a lower portion of the dispensing device.
Figure 6:
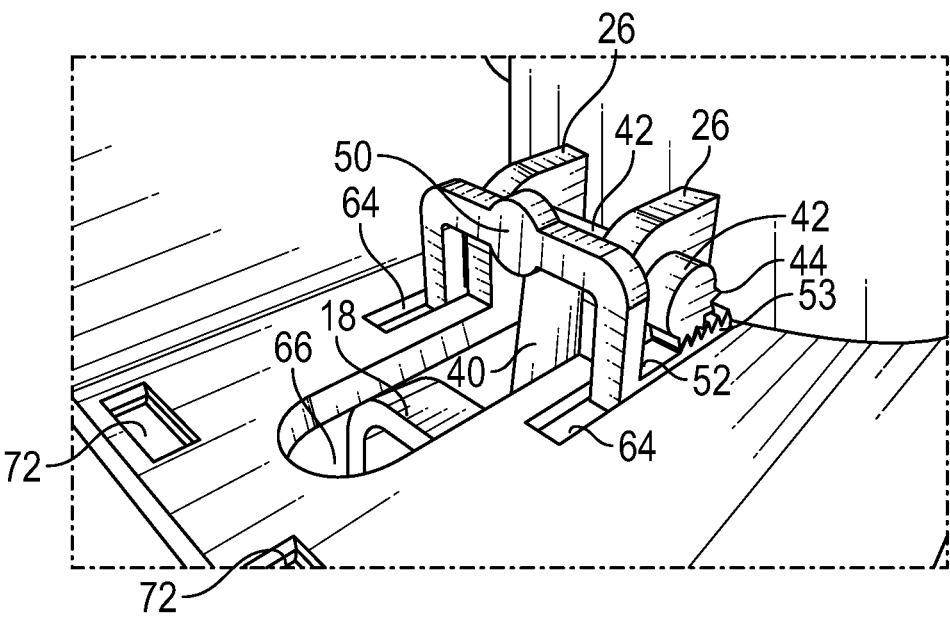
FIG. 6 is a greatly enlarged fragmentary perspective view of the lower interior portion of the outer shell showing the actuator mechanism of the dispensing device.

Referring also to FIGS. 5 and 6, elements making up the actuator mechanism and the pump/nozzle 20 are shown. The actuator mechanism includes a pump actuator 22 and pin 42 with pinion gears 44 formed on each end thereof. The pin 42 is mounted transversely to the upper end of the stem 40 of the handle or lever 18. The pump actuator 22 comprises two spaced rack supports 52 with rack gears 53 (FIG. 6) that cooperate with the pinion gears 44. The rack supports 52 are interconnected by an actuator plate 50. As best seen in FIG. 6, the stem 40 extends from the handle or lever 18 and protrudes through a stem opening 66 located on the lower surface of the outer shell 12. Two rack support grooves 64 are formed on the lower surface of the outer shell and are disposed on opposite lateral sides of the lever opening 66. The rack supports 52 are secured within the grooves 64. A pair of brackets 26 extends upwards from the lower interior surface of the outer shell. The pin 42 is secured within openings made on the brackets 26 such that the pinion gears 44 are exposed at each end. The pinion gears 44 are aligned with and engage the rack gears 53.

Figure 4:
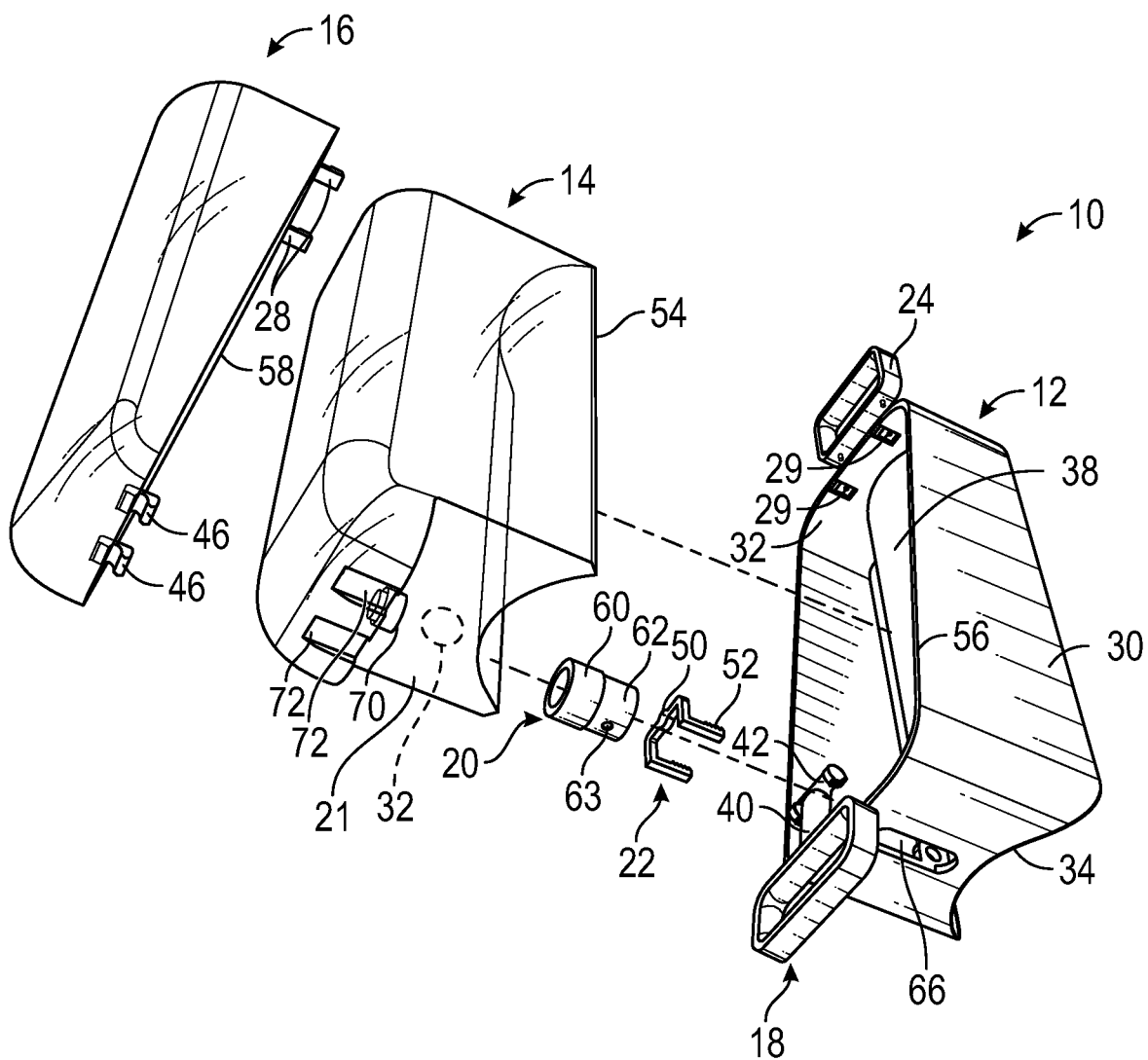
FIG. 4 is a bottom perspective view of the dispensing device.

The pump/nozzle piece 20 is mounted within the inner pod 14. The pump/nozzle piece 20 is intended to represent any type of manually operated unit that can pressurize a flexible container of material causing fluid to be forced through a nozzle, or a conventional spray bottle type pump comprising a trigger mechanism, piston, and cylinder. As shown, the pump/nozzle piece 20 has a stationary element 60 and a slidable element 62. Referring to FIG. 5, the front or forward edge of the stationary element 60 is secured to the inner pod 14 by the nozzle mount 70 that protrudes from the overhang 19. The slidable element 62 abuts the actuator plate 50. A flexible bag of sanitizing fluid (not shown) is connected to and sealed with the stationary element 60. The slidable element 62 resides outside of the flexible bag. As seen in FIG. 4, the slidable element 62 has a hole 63 that is exposed. Fluid dispensing openings 72 are provided on the lower surface of the overhang 19 allowing sanitizing fluid to pass.

For use of a conventional spray pump for the pump/nozzle piece 20, the slidable element 60 forces a piston (not shown) into a cylinder (not shown) that are both housed within the stationary element 60. Fluid within the cylinder is therefore displaced and forced through the nozzle. When the slidable element 62 is released, the piston retracts such as by the force of an internal spring (not shown) thereby pulling fluid back into the cylinder through the hole 63. Although the pump 20 is illustrated as a two-element unit, it should be understood that this illustrated pump is but one example of a pump unit that can be used with the actuator mechanism. The pump actuator 22 can activate any type of pump unit with a depressible part that requires force to be applied thereto in order to operate the pump.

According to another embodiment of the invention, the actuator mechanism can be a sensor 32 (FIG. 4) that communicates electrically with the pump/nozzle piece 20 to control activation of the pump portion. In this regard, the pump is therefore an electrical pump and is not a manually operated pump. One advantage of this embodiment is that it eliminates the need for the lever 18 and the manual actuator mechanism in favor of a single sensor that controls the pump. As shown, the sensor 32 is mounted to the bottom or lower end 21 of the inner pod. When the hands of a user are placed under the dispensing device, the sensor 32 senses the presence of the user's hand(s) and then sends a control signal to the pump-to-pump fluid.

In order to replace a spent bag of sanitizing fluid, the front cover 16 is removed by use of a key 24. The key has two protruding pins 25 (FIGS. 3 and 4) that align with pin openings 36 formed on the upper surface of the upper shell 12. A user pushes the pins 25 through the holes 36 which results in depressing the upper engaging tabs 28. At this stage, the user can then pull the front cover away from the device. The inner pod 14 is slid away from the outer shell to expose the flexible bag. The pump/nozzle piece 20 is disconnected from the nozzle mount 70 and the spent bag and attached pump/nozzle piece are removed through the open rear side of the inner pod. A new bag of sanitizing fluid with the integral pump/nozzle piece 20 are placed within the inner pod. The nozzle side of the stationary element 60 is connected to nozzle mount 70. The inner pod is slid back into position within the outer shell 12, and the front cover 16 is then replaced over the inner pod 14.

Another configuration that can be used for the inner pod 14 is one in which the container of sanitizing fluid and the integrally attached pump/nozzle piece 20 are sealed within the inner pod 14. Accordingly, the entire inner pod 14 is replaced when the sanitizing fluid is spent.

In order to dispense fluid, a user grasps the lever 18 and moves it in a back-and-forth action in order to operate the pump/nozzle piece 20. The slidable element 62 reciprocates with respect to the stationary element 60 and air is thereby introduced into the flexible bag. Referring to FIG. 5, the user pulls the lever to the left in order to expose the air hole 63. As the user pushes the lever to the right, the actuator plate 50 causes the slidable element 62 to shift to the left thereby introducing air into the flexible bag. Each time the lever is pulled back and forth, additional air is introduced into the bag in this matter. When the bag is sufficiently pressurized, fluid within the bag can be dispensed through a small orifice (not shown) formed on the nozzle side of the stationary element 60. Alternatively, each time the lever is pulled back and forth, the slidable element 62 is reciprocated causing fluid to be displaced from within the cylinder within the stationary element 60 and hence fluid is ejected through the nozzle side of the stationary element. The dispensed fluid passes downward through the dispense openings 72 onto the user's hands. The paired pinion and rack gears 44 and 53 ensure that the actuator plate 50 remains aligned with the movable piece 62 of the pump.

It should be understood that while a particular construction is shown with respect to an exemplary pump/nozzle piece 20, it should be understood that other types may be incorporated within the invention in which the actuator plate 50 can be used to actuate a movable element of a pump.

Figure 7:
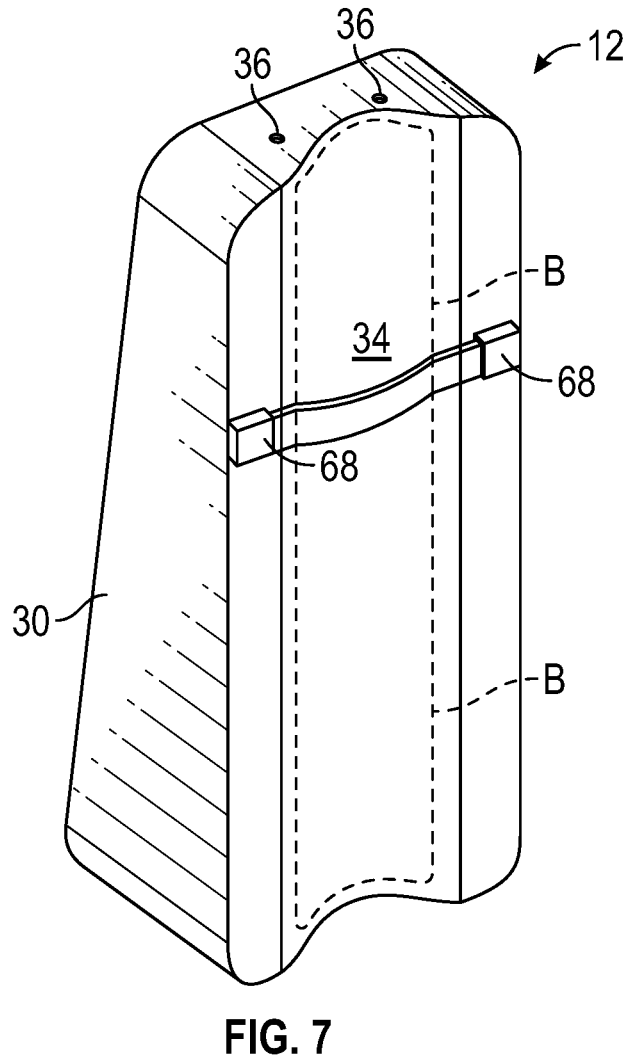
FIG. 7 is a rear perspective view of the outer shell specifically illustrating the concave shape thereof.

Referring to FIG. 7, the rear side 34 of the outer shell 12 is shown having a concave curvature. A vertical steering column C or stem of a scooter is illustrated in broken lines. This figure shows the concave shape allows for greater surface area contact between the outer shell and steering column C. The particular curvature of the rear side 34 can be adapted to best complement the steering column C of a scooter or frame tubes of a bicycle. A desired type of fastening means can be used to secure the device 10 to the steering column C, such as by zip ties, hook and pile fasteners, or similar securing means, these being generally indicated as securing means 68.

According to one method of the invention, the dispenser device 10 is secured to an object such as a shared transport (e.g., a scooter or bicycle) and more specifically, the shared transport may be an IoT transport device. The dispensing device 10 is loaded with a flexible bag of sanitizing liquid with an integral pump/nozzle piece 20. A user grasps the lever 18 and moves it back and forth or in a reciprocating motion to dispense a desired quantity of the sanitizing liquid through the nozzle side of the piece 20. The lever rotates about an axis along the length of the pin 42. This axis is oriented in a transverse direction to the front and rear sides of the dispensing device. The extent of rotation of the lever 18 is limited by the length of the opening 66 formed in the lower surface of the outer shell 12. The extent of rotation can also be limited by the length of the rack gears 53 on the rack supports 52 in which stops (not shown) are provided at each end of the rack gears 53.

Figure 8:
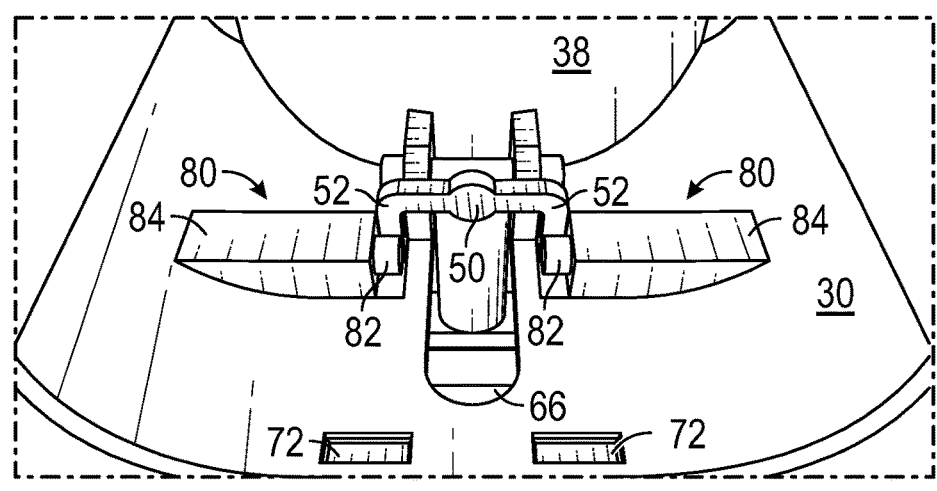
FIG. 8 is a greatly enlarged fragmentary perspective view of the actuator mechanism in another embodiment including a controllable solenoid for selectively locking and unlocking of the dispensing device.

FIG. 8 is a greatly enlarged fragmentary perspective view of the actuator mechanism in another embodiment including a controllable solenoid for selectively locking and unlocking of the dispensing device. In this embodiment, the actuator mechanism can be locked and unlocked by an electrical signal that controls two solenoid devices 80. The electrical signal can be produced by a controller unit (not shown) that is mounted to the IoT transport device. More specifically, the user operates the phone App to executes the purchase transaction of the transport device in which the user also selects to use the dispenser device. When the use transaction is completed, the electrical signal is sent from the controller to energize the solenoid causing the plunger or pistons 82 to withdraw into the respective solenoid bodies 84. In this energized position, the pistons 82 are cleared from the rack supports 52 so the lever 18 can be operated to dispense fluid. When the dispensing device is not authorized for use, the pistons 82 are returned to the extended positions as shown in this figure which prevents the lever 18 from moving.

According to another embodiment of the invention, the dispensing device 10 may optionally incorporate its own microcontroller for purposes of controlling the operation of the dispensing device. This optional feature of the invention, as shown only in FIG. 1, illustrates a microcontroller 51 that is mounted within the outer shell 38 and secured to the interior rear surface 38. The microcontroller 51 communicates with the actuator mechanism of the dispensing device to control actuation so that the dispensing device is made available for dispensing based on a number of parameters which could include a length of time, a number of squirts/pumps of the dispensed fluid or other operation parameters. FIG. 1 also shows a status indicator 53 in the form of a status light which can indicate when a bag of dispensing fluid is low or out of fluid. In this regard, a low fluid condition in the bag 53 can be communicated to a microprocessor of the microcontroller which in turn enables the microprocessor 51 to energize the status indicator 53. Although microcontroller 51 is illustrated as being mounted to the outer shell 38, alternatively, the microcontroller could be mounted to directly to the transport device and wired connection (not shown) can be made to the controlled components of the dispensing device being controlled, including the pump actuator.

Figure 9:
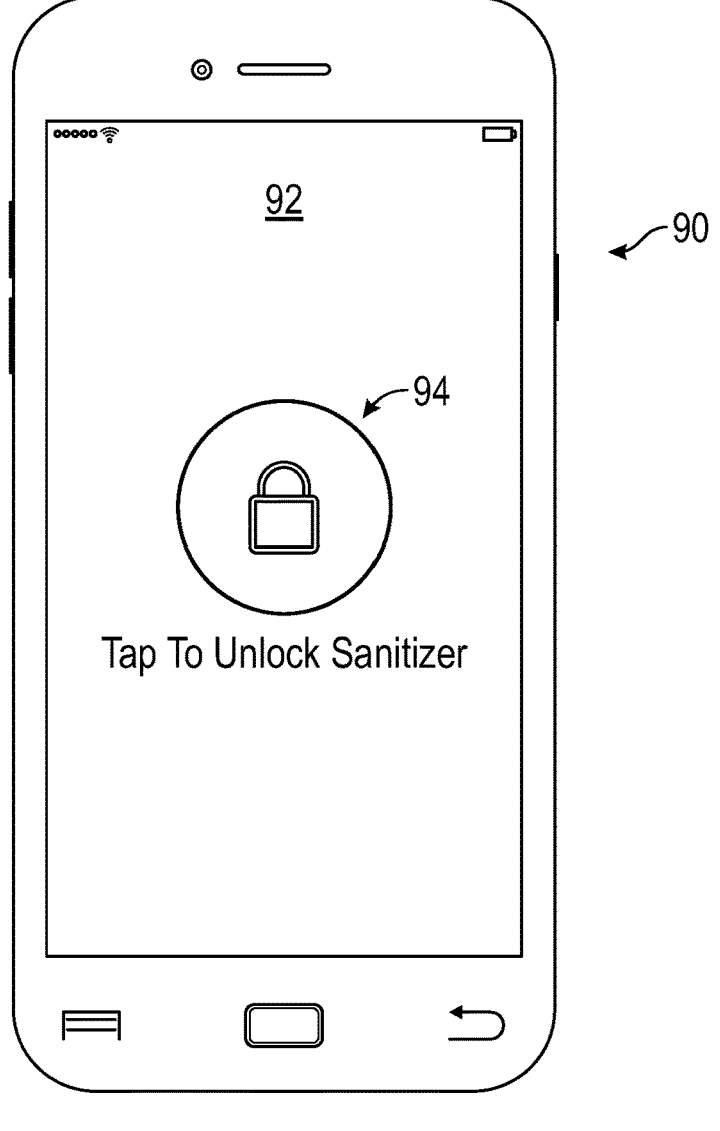
FIG. 9 is a sample user interface on a mobile communication device indicating the capability for a user to selectively control unlocking of the dispensing device.

FIG. 9 shows a sample user interface 92 on a mobile communication device 90 indicating the capability for a user to selectively control unlocking of the dispensing device. The communication device 90 runs a sanitizer dispensing device App that allows a user to control the dispenser device, such as through a rented IoT transport device. This user interface (UI) more specifically shows that the dispensing device is currently locked as indicated by an image 94 of a locked padlock. The text in the UI instructs the user to tap on the screen of the mobile device to unlock the sanitizer device. The command to tap the UI screen appears after the user has executed a rental transaction for the accompanying transport and could be an additional option for the user to choose when the user conducts the rental transaction and therefore, the sanitizer dispensing App is made part of the App used for executing the rental transaction of the transport. Alternatively, the sanitizer dispensing App can be a stand-alone App that is able to communicate with the IoT transport device to determine when the IoT transport device has been rented.

Figure 10:
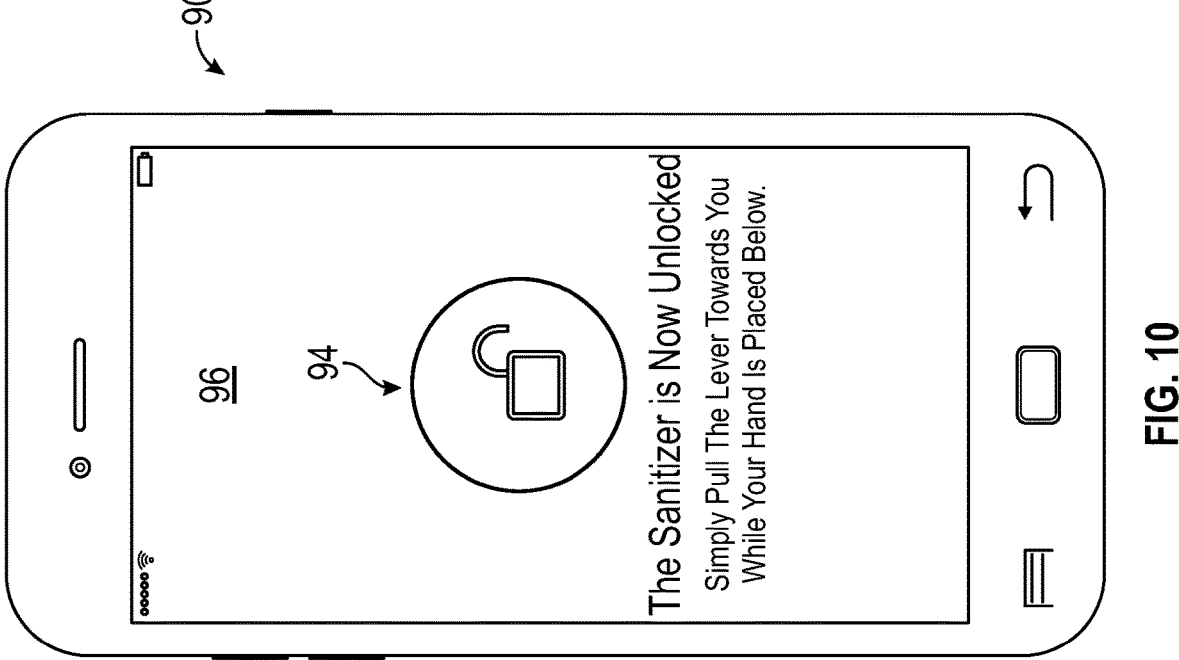
FIG. 10 is another sample user interface showing the device is unlocked and ready for use with respect manual activation of the device by pulling the lever.

FIG. 10 shows a sample user interface 96 indicating the device is unlocked and ready for use with respect manual activation of the device by pulling the lever. Accordingly, for this UI, it corresponds to the embodiment of the device that includes manual dispensing by pulling on the lever 18. As explained with respect to FIG. 8, unlocking the sanitizer device is facilitated by a signal sent from a controller of the IoT device to the solenoids 80. The dispensing device is shown as being unlocked as indicated by the image 94 of the padlock being open.

Figure 11:
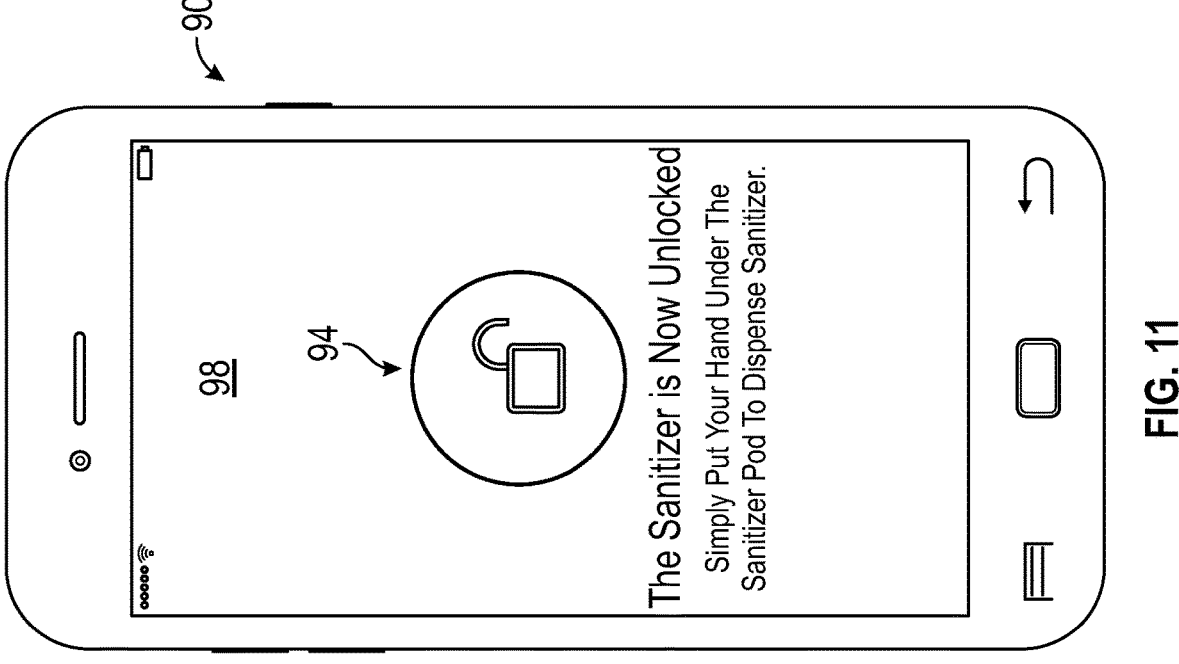
FIG. 11 is another sample user interface showing the device is unlocked and ready for use with respect activation of the device by a sensor.

FIG. 11 is another sample user interface 98 showing the device is unlocked and ready for use with respect to automatic activation of the device by a sensor. The dispensing device is shown as being unlocked as again indicated by the image 94 of the padlock being open. This UI 96 corresponds to the embodiment of the device that includes the sensor 32 that senses the presence of the user's hand(s). Unlocking the sanitizer device is facilitated by a power signal sent from the controller of the IoT device that powers the sensor 32. Thus, on/off control in this embodiment of the sanitizer device is simply achieved by selectively powering the sensor 32 that in turn activates the pump.

Figure 12:
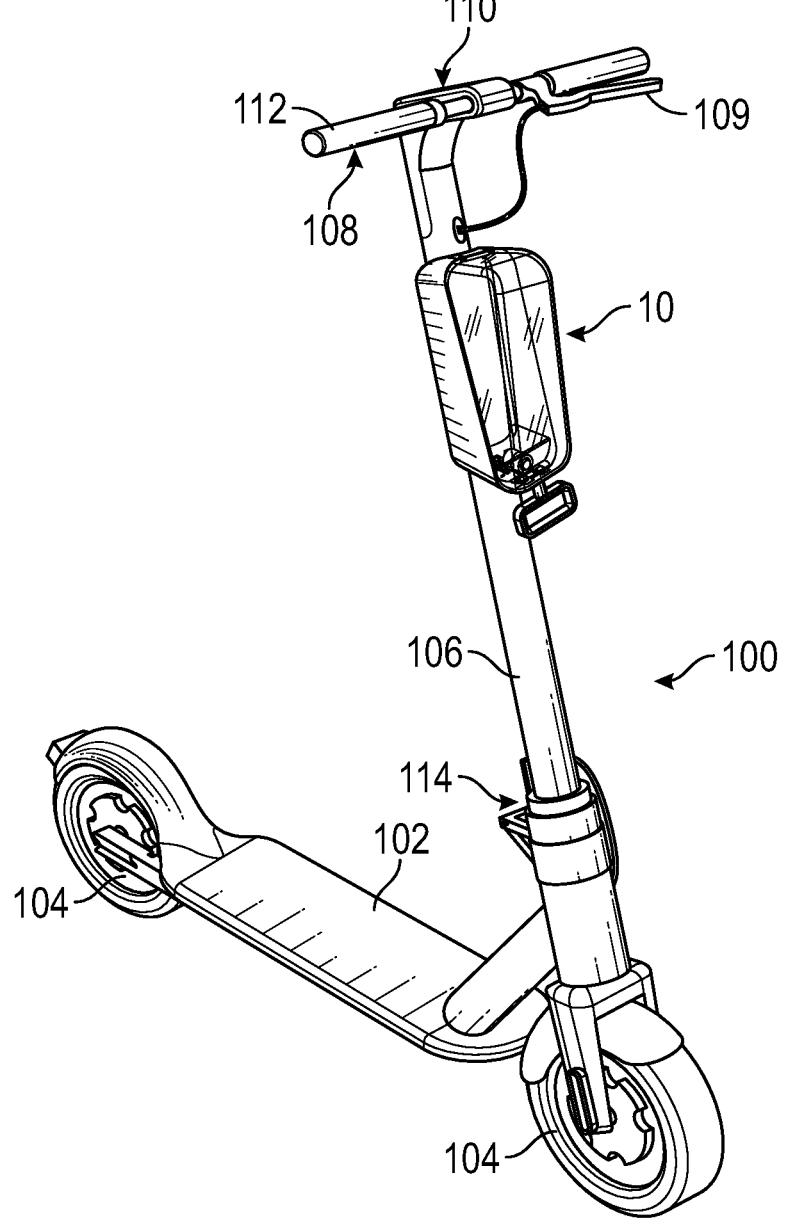
FIG. 12 is a perspective view of the dispensing device mounted to an example transport, namely, a scooter.

FIG. 12 shows a combination of the sanitizer dispensing device 10 and a transport, namely, a scooter 100. FIG. 12 is intended to represent any type of scooter device. The depicted example of the scooter 100 includes two wheels 104, a platform 102, and a vertical steering column or stem 106 with a transverse oriented handlebar 108. Additional details of the scooter are shown to include a hand brake 109, handle grips 112 and a clamp 114 to adjust the height of the steering column 106. The sanitizer device 10 is illustrated as being mounted to the upper end of the steering column with the outer shell of the sanitizer device facing forward. However, the sanitizer device can be mounted on the steering column at any desired orientation depending on the choice of the user/owner of the scooter. Similarly, the dispensing device can be mounted to a frame tube of a bicycle or other transport in any desired orientation.

In connection with use of the device with an IoT transport device, the scooter 100 may also represent such an IoT transport device in which the scooter incorporates IoT functionality. The IoT functionality may include a scanner 110 that is used to scan a QR code or other type of coded image on a UI of the user's mobile communication device that enables the user to complete a rental transaction.

According to another method of the invention, it involves the use of a mobile phone application (App) to control unlocking of the device by a user. According to this method, the hand sanitizer is mounted to the transport device of choice, such as an IoT scooter or bicycle. The structure of the hand sanitizing device is the same as described but further includes an electrical connection to a comprising: (a) providing a hand sanitizer device comprising an outer shell, an inner pod received through an open front of said outer shell, a front cover placed over a front surface of said inner pod, an actuator mounted in said shell, a pump communicating with said actuator, said pump having a nozzle opening for dispensing sanitizing fluid; (b) providing a first App installed on a mobile communication device, said App having a plurality of user interfaces enabling a user to select activation of said dispenser device; (c) conducting a rental transaction for a transport utilizing a second App such that the user executes the rental transaction by a QR code appearing on the user's mobile communication application that activates the transport; (d) using the first App to selectively unlock the sanitizer device for use; and (e) actuating said actuator to cause sanitizing fluid to be dispensed through said nozzle opening.

Figure 13:
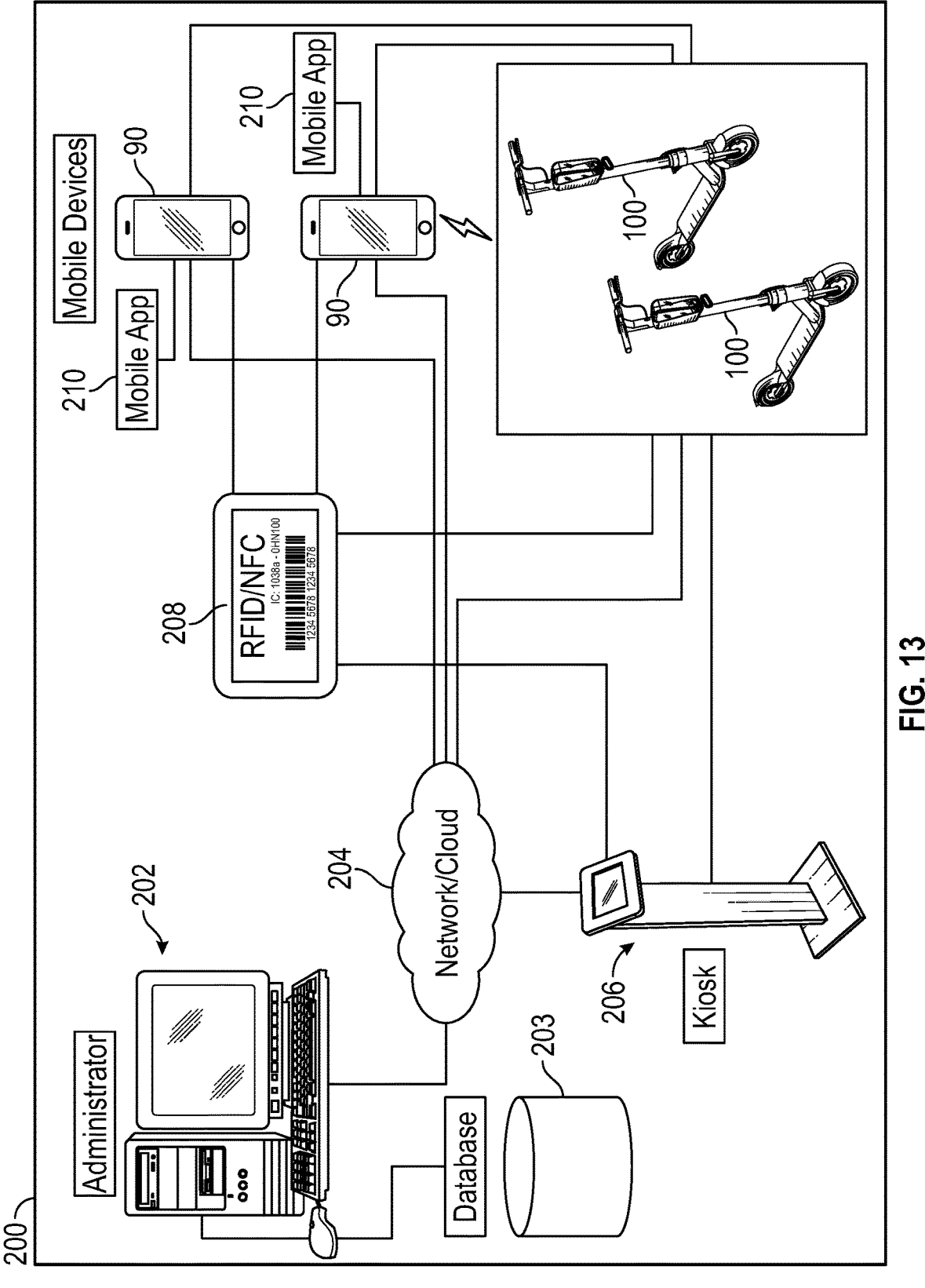
FIG. 13 is a schematic diagram of an optional and exemplary computer processing and communication network that may be used in connection with the invention.

FIG. 13 provides an optional and exemplary computer processing and communication network that may be used in connection with the invention. More specifically, FIG. 10 illustrates a block diagram of a system 200 that includes one or more user computers shown as an administrator computer 202, it being understood that computer 202 may also represent multiple customer computers. The computer 200 could be in the form of a desktop computer, laptop computer and the like.

FIG. 13 also schematically illustrates a plurality of transport devices such as the scooters 100. The devices 100 may communicate wirelessly with one or more of the mobile communication devices 90.

Each of the mobile communication devices 90 may operate to run their own mobile app 210 to process the data exchanged with the transport devices 100. The processed data may further include data stored in the local database of the communication device 90 regarding the type of transaction(s) to be conducted for use of the hand sanitizer device and all of the details of the transaction(s). The communication devices 90 may communicate with a communication network such as the Internet 204 as by a web interface. The network 204 may also represent a cloud provider who facilitates communications with any or all communication endpoints shown in the system 200. The mobile devices 90 may also communicate with any other of the computers in the system 200 through the network 204, such as the computer(s) 202.

FIG. 13 also shows a kiosk 206 that may be used to facilitate a transaction for use of a dispensing device. The kiosk 206 can be co-located with one or more of the transport devices, or the kiosk could be remotely located. The kiosk communicates with the transport devices through the network 204 or through e.g., a Bluetooth connection to the transport devices if co-located. A user wishing to reserve a transport device and use of a corresponding dispensing device would interact with various user interfaces (not shown) presented on a screen of the kiosk. These user interfaces may have functionality similar to any or all of the user interfaces shown in the FIGS. 9-11 and 14-19. For example, a user could execute a rental transaction for use of scooter and attached dispensing device, at a desired location and time. The user may pay for the transaction at the kiosk.

FIG. 13 shows another element that can be used to facilitate execution of a transaction, shown as an RFID or NFC tag 208. As understood by those skilled in the art, near field communications (NFC) enables two electronic devices to communicate with one another; an NFC card and card reader communicate to execute a transaction or authorization. NFC cards are incorporated within many credit cards for executing purchase transactions in which a card reader is located at the purchase location for completion of the transactions. NFC is similar to RFID technology in that both involve a card or tag which is read in a contactless manor by some form through wireless communication. NFC is usable only within a very short distance range while RFID is usable within extended distances, depending upon the strength of the interrogation field generated within the RFID system. According to the present invention, the tag 208 may be incorporated within a user's mobile device 90, noting that most "smart phones" currently have NFC technology capabilities. An NFC reader (not shown) may be added to a transport device or an NFC reader may be incorporated within the kiosk 206 to enable execution of a transaction for use of the dispensing device. In this way, a user is easily able to execute a transaction for use of a dispensing device by the user's mobile communication device or at a convenient kiosk location near the transport device.

The mobile communication devices 90 have their own internal computer processing capabilities with integral computer processors and other supporting hardware and software. The mobile communication devices may be specially configured to run the mobile software applications in order to view user interfaces and to view and update system data. All of the functionality associated with the system may be incorporated in both the mobile communication devices 90 and user computer(s) as modified by mobile software applications especially adapted for the mobile communication device hardware and operating systems. In connection with operating systems, it should therefore be understood that the mobile communication devices 90 are not limited to any particular operating system, Apple iOS and Android-based systems being but two examples.

The network 204 more specifically may be any type of network familiar to those skilled in the art that can support data communications using any of a variety of commercially-available protocols, including without limitation TCP/IP, SNA, IPX, AppleTalk®, and the like. Merely by way of example, the communications network 204 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The computer(s) 202 may alternatively represent a server computer. One type of server may include a web server used to process requests for web pages or other electronic documents from the mobile devices 90 and other user computers in the system. The web server can be running an operating system including any of those discussed above, as well as any commercially-available server operating systems. The web server can also run a variety of server applications, including HTTP servers, FTP servers, CGI servers, database servers, Java servers, and the like. In some instances, the web server may publish operations available as one or more web services.

The system 200 may also include one or more file and/or application servers, which can, in addition to an operating system, include one or more applications accessible by a client running on one or more of the computer(s) 202 and mobile communication devices 90. The file/application server(s) may be one or more general purpose computers capable of executing programs or scripts in response to the mobile devices 90 and computer(s) 202. As one example, the server may execute one or more web applications. The web application may be implemented as one or more scripts or programs written in any programming language, such as Java®, C, C#™ or C++, and/or any scripting language, such as Perl, Python, or TCL, as well as combinations of any programming/scripting languages. The application server(s) may also include database servers, including without limitation those commercially available from Oracle®, Microsoft, Sybase®, IBM® and the like, which can process requests from database clients running on a user computer.

The system 200 may also include a database 203 for storing all data associated with running the apps 210 and running any other computer programs associated with user interfaces provided to a user regarding the functions relating to any transaction for use of the hand sanitizing devise. The database 203, although shown at the administrator location, may reside in a variety of different locations where computer processing is available. The database 203 may reside in a storage-area network ("SAN"). Similarly, any necessary files for performing the functions attributed to the mobile devices 90 and computer(s) 202 may be stored locally on the respective mobile communication devices or computer and/ or remotely, as appropriate.

In accordance with any of the computer(s) 202, these may be generally described as general-purpose computers with elements that cooperate to achieve multiple functions normally associated with general purpose computers. For example, the hardware elements may include one or more central processing units (CPUs) for processing data. The computer(s) 202 may further include one or more input devices (e.g., a mouse, a keyboard, etc.); and one or more output devices (e.g., a display device, a printer, etc.). The computers may also include one or more storage devices. By way of example, storage device(s) may be disk drives, optical storage devices, solid-state storage device such as a random-access memory ("RAM") and/or a read-only memory ("ROM"), which can be programmable, flash-updateable and/or the like.

Each of the computers and servers described herein may include a computer-readable storage media reader; a communications peripheral (e.g., a modem, a network card (wireless or wired), an infra-red communication device, etc.); working memory, which may include RAM and ROM devices as described above. The server may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The computers and serve permit data to be exchanged with the network 110 and/or any other computer, server, or mobile device.

The computers and server also comprise various software elements and an operating system and/or other program-mable code such as program code implementing a web service connector or components of a web service connector. It should be appreciated that alternate embodiments of a computer may have numerous variations from that described above. For example, customized hardware might also be used and/or particular elements might be implemented in hardware, software (including portable software, such as applets), or both. Further, connection to other computing devices such as network input/output devices may be employed.

It should also be appreciated that the methods described herein may be performed by hardware components or may be embodied in sequences of machine-executable instruc-tions, which may be used to cause a machine, such as a general-purpose or special-purpose processor or logic cir-cuits programmed with the instructions to perform the methods. These machine-executable instructions may be stored on one or more machine readable mediums, such as CD-ROMs or other type of optical disks, ROMs, RAMs, EPROMs, EEPROMs, magnetic or optical cards, flash memory, or other types of machine-readable mediums suit-able for storing electronic instructions. Alternatively, the methods may be performed by a combination of hardware and software.

The term "software" or "app" as used herein shall be broadly interpreted to include all information processed by a mobile communication device, computer processor, a microcontroller, or processed by related computer executed programs communicating with the software. Software there-fore includes computer programs, libraries, and related non-executable data, such as online documentation or digital media. Executable code makes up definable parts of the software and is embodied in machine language instructions readable by a corresponding data processor such as a central processing unit of the computer. The software may be written in any known programming language in which a selected programming language is translated to machine language by a compile, interpreter or assembler element of the associated computer.

Considering the foregoing exemplary computer and com-munications network and elements described therein, in connection with one embodiment of the invention, it may also be considered a software program or software platform with computer coded instructions that enable execution of the functionality associated with the user interfaces of FIGS. 9-11 and 14-19. More specifically, the invention may be considered a software program or software platform that enables the execution of any transaction relating to the use of the hand sanitizer dispensing devices. The software program or platform may further include options for a user to access other types of mobile platforms that may be secured to a transport device such as a device for dispensing of drinks or snacks or the device secured to a kiosk that is co-located with one or more transport devices.

Figures 14, 15:
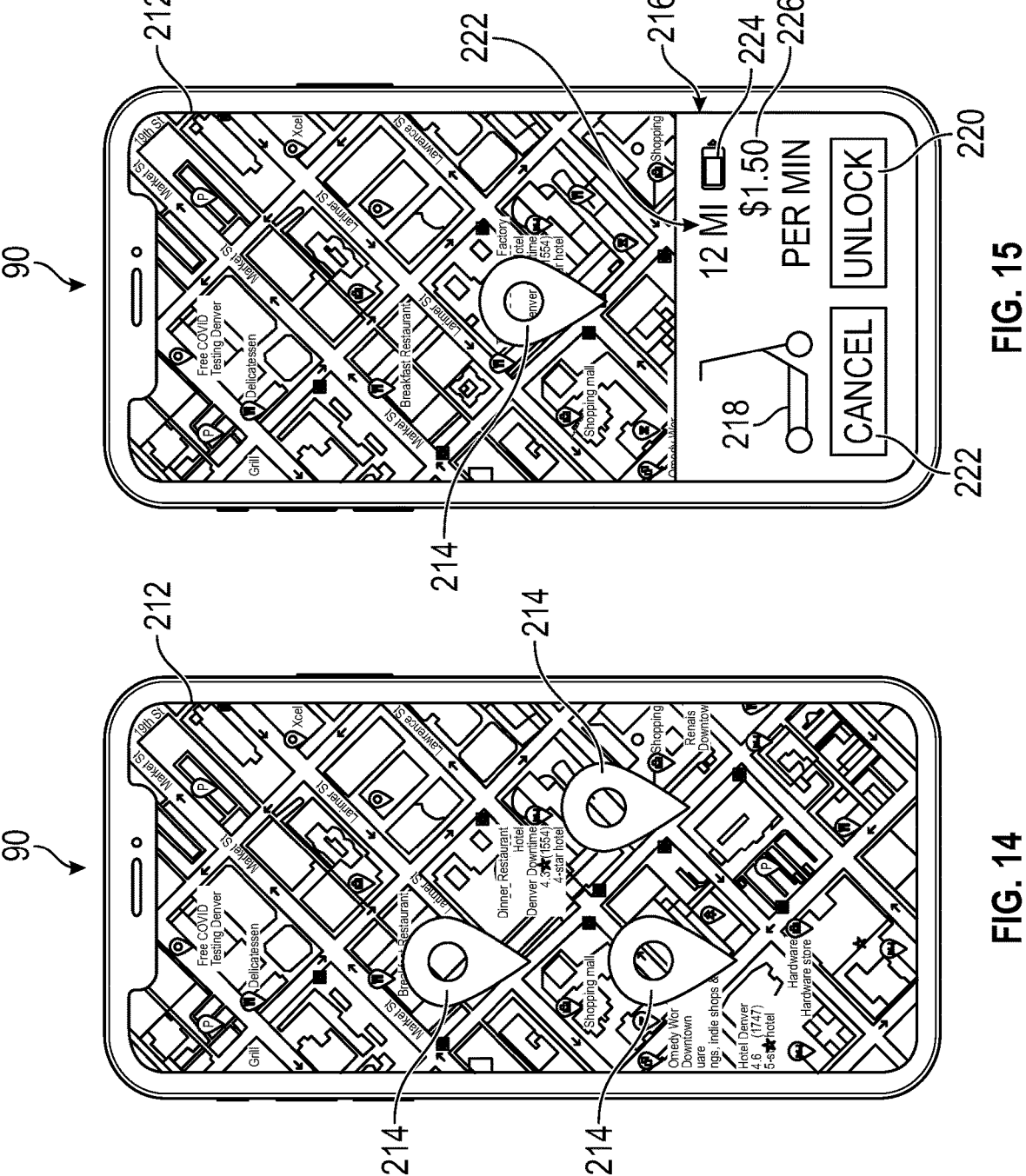
FIG. 14 is sample user interface on a mobile communication device showing a map in which a user may select a location for use of a transport device and an attached dispensing device.
FIG. 15 is sample user interface on a mobile communication device showing the map of FIG. 14 and details of a transaction that the user is executing for use of the dispensing device.

Referring to FIG. 14, this provides a sample user interface of a mobile communication device showing a map in which a user may select a location for use of a transport device and an attached dispensing device. More specifically, this figure shows a mobile communication device 90 in which the screen of the communication device shows an enlarged portion of a map 212 with various locations 214 where a dispensing device can be found that is mounted two or is otherwise associated with one or more transport devices, such as a scooter or bicycle. Once the user pulls up the map on their communication device, the user may select the most convenient location for which to execute a transaction for use of the dispensing device.

Referring to FIG. 15, this sample user interface shows a portion of the map of FIG. 14 and details of a transaction that the user is executing for use of the desired dispensing device. The additional information shown on this user interface is found within the user manipulation area 216 of the user interface, and the details shown include an identification of the type of transport device 218, an unlock function 220 which enables the user to unlock the dispensing device for use and a cancel function 222 that enables the user to cancel the transaction or to otherwise terminate some selected action in the transaction. Another feature shown in FIG. 15 includes a display indicating the cost of the transaction 226, shown as $1.50 per minute. This cost indication may display that the user has the ability to dispense fluid from the dispensing device at the cost of a price per unit of time. This figure also may illustrate other typical features for a mobile communication device, such as the status of the battery 224.

Figures 16, 17:
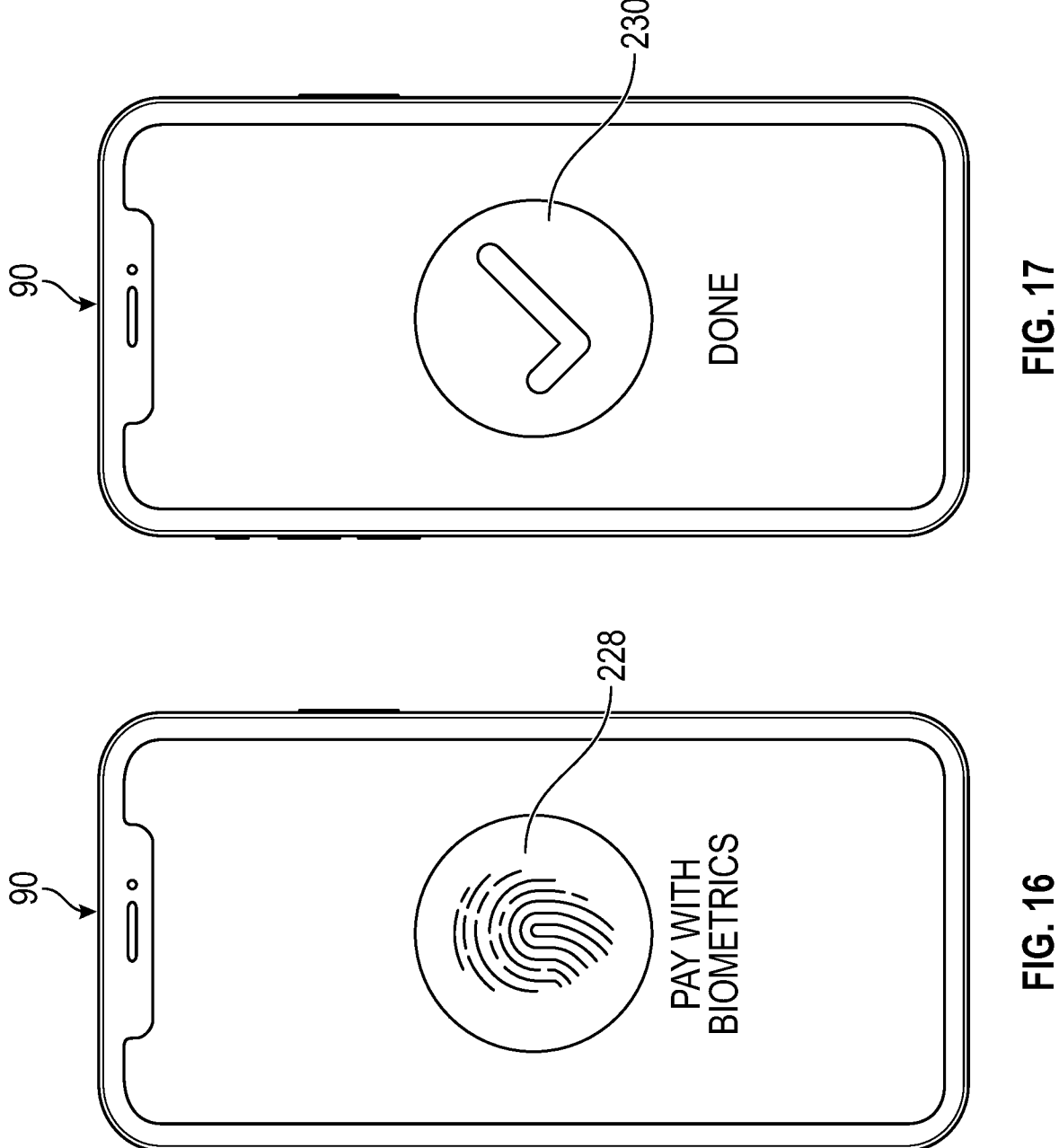
FIG. 16 is another sample user interface on a mobile communication device indicating the capability for a user to selectively control payment for use of the dispensing device.
FIG. 17 is another sample user interface on a mobile communication device indicating that the user has successfully executed a transaction for use of the dispensing device.

FIG. 16 is another sample user interface of a mobile communication device indicating the capability for a user to selectively control payment for use of the dispensing device. The intent of this figure is to illustrate that payment can be validated with any one of more modern or developing payment options such as payment with biometrics 228. The example shown is to pay for the transaction by fingerprint validation in which the user places his/her finger on the user screen. In addition to fingerprint validation, the invention also contemplates use of iris recognition in which a scan is made of the user's iris by placing the communication device near the user's face, and the scan is conducted using visible and/or near-infrared light to take a high contrast photograph of the users iris. Yet another form of biometric validation could include face recognition which utilizes a similar technology as iris scanning.

FIG. 17 is another sample user interface of a mobile communication device indicating that the user has successfully executed a transaction for use of the dispensing device.

Figures 18, 19:
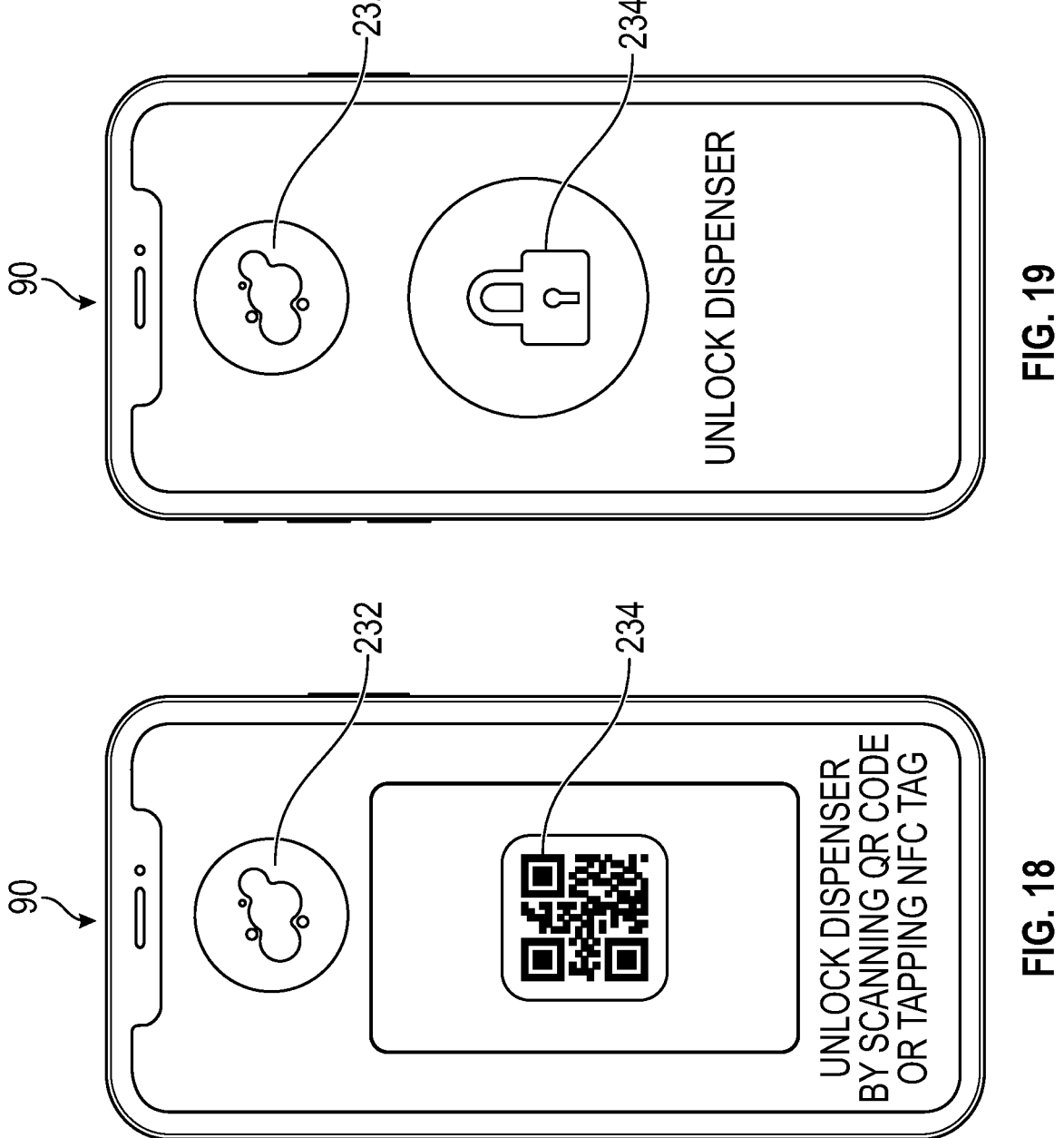
FIG. 18 is another sample user interface on a mobile communication device enabling a user to unlock a dispensing device for use, e.g., by scanning a QR code or engaging an NFC tag.
FIG. 19 is another sample user interface on a mobile communication device showing the user in the process of unlocking the dispensing device.

FIG. 18 is yet another sample user interface of a mobile communication device enabling a user to unlock a dispensing device by an unlocking function 234 in which unlocking is achieved by scanning a QR code or engaging an NFC tag. This figure also shows a device identifier 232 which may indicate the type of dispensing device being used, the type of transport device to which the dispensing device is associated, or both.

FIG. 19 is yet another sample user interface on a mobile communication device showing the user in the process of locking or unlocking the dispensing device, in which a locked/unlocked indication is provided within the unlocking function 234.

With respect to each of the user interfaces shown in the FIGS. 14-19, each of these are generated by the app that is installed on the mobile communication device. It should be understood that the specific layout and the information provided on the user interfaces may be updated overtime as the App 210 itself may be updated to enhance functionality for the user to selectively operate a dispensing device.

With respect to automated operation of the dispensing device, a number of features may be incorporated within the invention to enable reliable and continuous operation. It should be understood that each of the features of the invention discussed below may be adopted for each disclosed embodiment of the dispensing device and an App 210 that may be used to communicate with and control the dispensing device.

Each bag of fluid may be uniform in size and hold the same amount of sanitizing liquid. Uniformity in bag size ensures that equal amounts of fluid are dispensed when the dispenser device is activated. With knowledge of the quantity of liquid in each bag and the amount of liquid dispensed with each "squirt" or activation, a calculation can be made as to the number of squirts or activations remaining until the bag is empty. The microcontroller 51 may include a counter which keeps track of the number of squirts or activations executed. With this counting feature, the microcontroller can determine when the bag of fluid is getting low and can then generate a signal to the status indicator light 53. This light 53 may be a color LED module. A green status indication light may indicate that the bag is full or near full; a yellow status indicator may indicate that the bag is getting low in fluid, and a red status indicator may indicate that the bag is close to empty and needs to be replaced. Other statuses may be provided with the light 53 as desired in which the light can be activated to flash and display different colors.

The microcontroller 51 may be connected by Bluetooth to any Bluetooth enabled mobile communication device so that there can be direct communications between the dispensing device and the user. For example, the microcontroller can be programmed to selectively broadcast a Bluetooth signal which can be picked up by the user's mobile communication device. At the desired time(s) and according to a preestablished sequence, the microcontroller can broadcast the Bluetooth signal to the user's communication device in order to provide the user as to a status of the dispensing device, which could include, the status and the amount of fluid remaining in the dispensing bag. Each dispensing device is assigned a unique Bluetooth ID so that any communications between a dispensing device and a user's mobile communication device are properly matched and controlled. The communications between the dispensing device and the user's mobile communication device can include all functionality associated with the user App installed on the user's communication device; therefore, this may eliminate the need for any intermediate processing to occur at a remote computer or kiosk. Accordingly, payments for a transaction, locking/unlocking the dispensing device, and user validation can all be achieved by the dispensing device and the users communication device.

Yet another feature of the integral microcontroller may be incorporation of a GPS module which enables determining the location of the dispensing device. Yet another feature of the integral microcontroller may include a Wi-Fi or GSM module to enable the microcontroller to directly connect to a Wi-Fi network or to directly connect to a GSM mobile telephone network. In this regard, the microcontroller therefore adopts some functionality associated with being his own mobile communication device. The size and shape of the outer shell of the sanitizer device can be modified to enable the microcontroller to have the desired functionality set forth above. If for example a GSM module and/or a Bluetooth module is added to the microcontroller, it may be desirable to mount the microcontroller on the exterior surface of the outer shell due to the increased size of the microcontroller.

Although the invention has been described herein with respect to preferred embodiments of a device and method, it should be understood that the invention is not specifically limited to these preferred embodiments, and the scope of the invention should be defined commensurate with the appended claims.

What is claimed is:

1. A hand sanitizing dispensing device for dispensing a quantity of fluid therefrom, comprising:

an outer shell having top and bottom surfaces, lateral side surfaces, an exterior rear surface with a concave shape, an interior rear surface, and an open front;

an inner pod having top and bottom surfaces, lateral side surfaces, a front surface, and an open rear, and a rear edge, said inner pod received through said open front of said outer shell, wherein the rear edge abuts the interior rear surface of the outer shell;

a front cover having top and bottom surfaces, lateral side surfaces, a front surface, and an open rear, said front cover placed over said front surface of said inner pod;

an actuator mounted to said dispensing device;

a pump connected to said inner pod by an overhanging edge and said pump communicating with said actuator;

said pump having a stationary element, a slidable element and a dispense opening for dispensing the fluid,;

a microcontroller mounted to said outer shell, said microcontroller communicating with said actuator to control actuation of said actuator; and preprogrammed computer instructions stored in said microcontroller for executing actuation of said actuator wherein said instructions include at least one of controlling actuation for dispensing the fluid: (1) over a period of time; (2) for a predetermined number of pump actuations; or (3) a combination of (1) and (2).

2. The dispensing device, as claimed in claim 1, wherein:

said actuator includes a sensor that senses the presence of a user's hand; and wherein sensing the presence of the user's hand results in said actuator to activate said pump to withdraw the fluid from a flexible bag type container and subsequently causing the fluid to be dispensed through a nozzle opening of said pump.

3. The dispensing device, as claimed in claim 1, further including: a status indicator controlled by said microcontroller that indicates when fluid retained in said hand sanitizing dispensing device is low or out of fluid.

4. A hand sanitizing dispensing device for dispensing a quantity of fluid therefrom, comprising:

an outer shell having top and bottom surfaces, lateral side surfaces, a rear surface with a concave shape, and an open front;

an inner pod having top and bottom surfaces, lateral side surfaces, a front surface, and an open rear, said inner pod received through said open front of said outer shell;

a front cover having top and bottom surfaces, lateral side surfaces, a front surface, and an open rear, said front cover placed over said front surface of said inner pod;

an actuator mounted to said dispensing device;

a pump communicating with said actuator and having a dispense opening for dispensing the fluid, wherein said actuator communicates with said pump to dispense the fluid;

a microcontroller mounted to said outer shell, said microcontroller communicating with said actuator to control actuation of said actuator; and preprogrammed computer instructions stored in said microcontroller for executing actuation of said actuator wherein said instructions include controlling actuation for dispensing a desired amount of fluid by a predetermined number of pump actuations.

* * * * *